United States Patent Office  
3,470,203  
Patented Sept. 30, 1969

3,470,203
INTERMEDIATES FOR PREPARING 1-AROYLINDOLE-3-ALKANOIC ACIDS
George Gal, Summit, and Meyer Sletzinger, North Plainfield, N.J., assignors to Merck & Co., Inc., Rahway, N.J., a corporation of New Jersey
No Drawing. Continuation-in-part of applications Ser. No. 255,642, Feb. 1, 1964, and Ser. No. 496,701, Oct. 15, 1965. This application Feb. 16, 1967, Ser. No. 616,496
Int. Cl. C07d 27/56
U.S. Cl. 260—326.15    12 Claims

ABSTRACT OF THE DISCLOSURE 1-aroylindole-3-acetic acids are prepared via 1-aroylindole-3-acetaldehydes and their acetals, or 1-aroylindole-3-ethanols and their ethers and esters, or 1-aroylindoxyls, or 1-aroylindole-3-acetonitriles. The Fischer indole synthesis gives the acetals, ethers, esters or nitriles which are then aroylated in the 1-position. Hydrolysis to aldehydes and alcohols permits oxidation to the acids. The nitriles are hydrolyzed enzymatically to the acids. The 1-aroylindoxyls, formed by ring closure of N-aroyl-N-o-carboxyphenyl alanines, are converted to the 1-aroylindole-3-acetic acids via the malonic acid, Reformatsky, Grignard, or Wittig syntheses.

Related applications

This application is a continuation-in-part of our copending applications, Serial No. 255,642 filed February 1, 1964, and Serial No. 496,701 filed October 15, 1965, and now abandoned.

Background of the invention

The discovery by Shen (U.S. Letters Patent 3,161,654) that 1-aroylindole-3-alkanoic acids are powerful anti-inflammatory drugs has brought forward practical difficulties in technical synthesis. In order to aroylate indole acetic acids, it was necessary to protect the acid function because the ring nitrogen must be treated with sodium hydride to form the N-metallo derivative. The ordinary protecting groups (e.g. esters) are removed by reagents which also tend to remove the 1-aroyl group. It has therefore been necessary to use protecting groups which are removable by special reactions not affecting the 1-aroyl, such as hydrogenation of benzyl esters, pyrolysis of t-butyl esters and the like. There is thus a need for intermediates which can be aroylated easily and then be converted to the acids.

Summary of this invention

This invention relates to certain intermediates which can be readily converted to the free 1-aroyl indolyl alkanoic acids after the aroylation of the 1-position. Thus, the indolyl-3-acetaldehyde acetals and 3-ethanol ethers are readily prepared by the Fischer indole synthesis from phenylhydrazines and levulinaldehyde acetals or 5-ketoalkanol ethers. These can then be aroylated in the 1-position by the standard method. Hydrolysis of the acetals gives the aldehydes and of the ethers give the free alcohols. Each can then be oxidized to the free acids. Similarly, the use of levulinonitrile gives the indole-3-acetonitriles which, after 1-aroylation, are enzymatically hydrolyzed to the indole acids. By ring closing an N-aroyl-N-o-carboxyphenylalanine, there is obtained a 1-aroylindoxyl which also is a key intermediate, since any of the Wittig, Grignard, Reformatsky or malonic acid syntheses can be used to convert it to a 1-aroylindole-3-alkanoic acid. Each of these intermediates is thus a key to an easy attainment of these important drugs.

Description of the invention

This invention relates to novel intermediates for preparing α-(3-indolyl) lower aliphatic acids having an aromatic carboxylic acyl (i.e., an aroyl or heteroaroyl) radical of less than three fused rings attached to the nitrogen atom of the indole ring. These N–1 aroyl and N–1 heteroaroyl indolyl aliphatic acid compounds, useful as anti-inflammatory drugs, may be chemically represented by the structural formula:

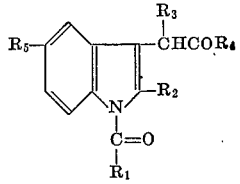

wherein $R_1$ is selected from the group consisting of aryl, substituted aryl, heteroaryl and substituted heteroaryl radicals;

$R_2$ is selected from the group consisting of a hydrogen atom and lower alkyl, lower alkenyl, aryl, aralkyl, alkaryl, substituted alkyl and substituted aryl radicals;

$R_3$ is selected from the group consisting of a hydrogen atom and lower alkyl and lower alkenyl radicals;

$R_4$ is selected from the group consisting of hydroxy, —$NH_2$, substituted —$NH_2$, amine salts, lower alkoxy, aralkoxy and —OM radicals, said M being a cation; and $R_5$ is selected from the group consisting of hydrogen and halogen atoms, and lower alkyl, lower alkoxy, haloalkyl, nitro, amino, substituted amino, cyano, aminomethyl, alkyl-substituted aminomethyl, mercapto, dialkylsulfonamide and benzylmercapto radicals.

A critical feature of the above compounds is the presence of an aroyl or heteroaroyl radical attached to the N–1 position of the indole nucleus. These acyl groups may be further substituted in the aromatic rings thereof with hydrocarbon groups or with functional substituents. The term "functional substituent," as used herein, is meant one other than hydrogen or hydrocarbon.

Among the preferred aroyl substituents that are operable herein are the benzoyl and naphthoyl groups. The aromatic rings of such groups may contain, and in the preferred compounds do contain, at least one functional substituent. This substituent may be a hydroxy or an etherified hydroxy (hydrocarbonoxy) group such as a lower alkoxy, aryloxy or an aralkoxy radical, e.g., methoxy, ethoxy, isopropoxy, propoxy, allyloxy, phenoxy, benzyloxy, halobenzyloxy, lower alkoxybenzyloxy and the like. Said functional substituent may also be a nitro group, representative examples of which that might be mentioned are acylamino, amineoxide, ketimines, urethanes, lower alkylamino, lower dialkylamino, amidine, acylated amidines, hydrazine or a substituted hydrazine, alkoxyamines and sulfonated amines. Furthermore, said functional substituent may be a mercapto or a substituted mercapto radical of the type exemplified by alkylthio groups, such as methylthio, ethylthio, and propylthio and arylthio or aralkylthio groups, e.g., benzylthio and phenylthio. The N-1 aroyl radical may, if desired, be haloalkylated, as with a trifluoromethyl, trifluoroethyl, perfluoroethyl, β-chloroethyl or like substituent, acylated as with acetyl, propionyl, benzoyl, phenylacetyl, trifluoroacetyl and like acyl groups, or it may contain a haloalkoxy or haloalkylthio substituent. In addition, the invention embraces compounds wherein the aroyl radical contains a sulfamyl, benzylthiomethyl, cyano, sulfonamido or dialkylsulfonamido radical. Further, it may contain a carboxy substituent, or a derivative thereof, such as an alkali metal salt or a lower alkyl ester of the carboxy radical, an aldehyde, azide, amide, hydrazide and the like, or an aldehyde derivative of the type represented by acetals or thioacetals. In the preferred compounds, the N-1 aroyl radical is benzoyl and the functional substituent is in the para position of the six-membered ring.

In accordance with this invention, the N-1 group may be a heteroacyl substituent in which the heterocyclic moiety is a five- or six-membered heteroaromatic ring, preferably of less than three fused rings. Examples of such radicals are the furyl, thienyl, pyrryl, thiazolyl, thiadiazolyl, pyrazinyl, pyridyl, alkylpyridyl, pyrazolyl, imidazolyl, oxazolyl, pyrimidinyl and isoxazoyl rings. Said heteroaryl radicals may be further substituted in the aromatic rings thereof with hydrocarbon groups or with functional substituents.

$R_2$, situated in the 2-position of the indole ring nucleus, may be hydrogen, although it is preferred that there be present at this position of the molecule a hydrocarbon radical having less than nine carbon atoms. Lower alkyl groups such as methyl, ethyl, propyl or butyl are the most satisfactory although aryl, alkaryl and aralkyl groups are also advantageous, such as phenyl, benzyl and tolyl. Furthermore, the alkoxy, halo, amino, substituted amino and nitro substituted derivatives of the foregoing are within the purview of this invention as are indoles having at the 2-position an unsaturated aliphatic radical such as allyl or vinyl or a cyclic aliphatic residue of the type cylcohexyl.

The acidic moiety of the pharmaceutically active N-1 acylated α-(3-indolyl) aliphatic acids produced from the intermediates of this invention is preferably a lower aliphatic acid such as acetic, propionic, butyric, valeric, 3-butenoic, 4-pentenoic and the like acids. Accordingly, $R_3$ in the foregoing formula may be a hydrogen atom, a lower alkyl radical such as methyl, ethyl, propyl and the like, or a lower alkenyl radical such as vinyl, allyl and the like.

In the preferred compounds of the invention, $R_5$ is a lower alkyl, lower alkoxy, nitro, amino or substituted amino group. Examples of the alkyl and alkoxyls that are embraced herein are methyl, ethyl, propyl, t-butyl, methoxy, ethoxy, i-propoxy and the like radicals. Examples of the substituted aminos are those derived from alkyl amines such as methylamino, ethylamino, isopropylamino, butylamino, diethylamino, ethyl-sec-butylamino, diisopropylamino and the like, alkanolamines such as ethanolamino, diethanolamino, 2-amino-1-butanol, morpholine and the like, aryl amines such as aniline, diphenylamine and the like, mixed aromatic-aliphatic amines such as monomethylaniline, monoethylaniline and the like, aralkyl amines such as benzylamine, β-phenylethylamine and the like, halosubstituted aliphatic or aromatic amines such as β-chloroethylamine, para - chloroaniline, para - chlorobenzylamine and the like, and other substituted aliphatic or aromatic amines such as β-methoxyethylamine, paratolylamine, para-methoxyaniline, and the like. $R_5$ is not limited to the foregoing classes of substituents, however, and may, if desired, represent substituents such as hydrogen, aryl, aryloxy, hydroxy, mercapto, halo, haloalkyl such as —$CF_3$, —$CHF_2$ and the like, nitro, haloalkyl, cyano, sulfamyl, sulfoxide, aminomethyl, substituted aminomethyl, carboxy and carboalkoxy groups.

The nitriles, aldehydes, acetals, alcohols and ethers of this invention are important intermediates in the synthesis of the corresponding indolyl-3-alkanoic acids and in many cases are themselves of importance as end products.

The synthesis of various compounds of this invention having on the indole ring system a 5-substituent which has a nitrogen attached to the homocyclic ring of the indole is generally based on the 5-nitro compound which may subsequently be transformed into the desired t-substituent. Such transformation can be carried out in a number of ways. Reduction of the 5-nitro groups gives a 5-amino group. Reaction of the amino with alkyl halides gives mono and dialkyl amine groups. If the alkyl halide is a dihaloalkylene group (e.g., 1,4-dibromobutane) a heterocyclic ring (e.g., pyrrolidino) is formed. Similarly, bis(β-chlorethyl)ether will give an N-morpholine compound. Alkylation can also be carried out simultaneously with reduction, e.g., with formaldehyde and Raney nickel and hydrogen, Acylation can similarly be carried out on the 5-amino compounds or on the 5-nitro (with simultaneous reduction) to give 5-acylamido compounds. The 5-amino group can be reacted with iso-cyanates to give 5-ureido compounds.

The α-[(1-aroyl- or 1-heteroaroyl)-3-indolyl] aliphatic compounds of this invention are intermediates for the preparation of 3-indolyl alkanoic acids which have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of antipyretic activity. For these purposes, they are normally administered orally in tablets or capsules, the optimum dosage depending, of course, on the particular compound being used and the type and severity of infection being treated. Although the optimum quantities of these compounds of this invention to be used in such manner will depend on the compound employed and the particular type of disease condition treated, oral dose levels of preferred compounds in the range of 1.0–200 mg. per day are useful in control of arthritic conditions, depending on the activity of the specific compound and the reaction sensitivity of the patient. The compounds of this invention are primarily intermediates for the preparation of these pharmaceutically active indolyl acids but they also themselves, in some cases, possess the same biological activity.

The preparation of the intermediates of this invention and their use in preparing the indolyl acids are described below. For purposes of discussion, these routes are grouped below by the general feature of the intermediate described. Each intermediate or group of intermediates has an accompanying Flow Sheet illustrating the reactions used and bearing the corresponding number for convenience. For further convenience, each reaction in the Flow Sheets is numbered with a number which, as well as being a key to the list of reagents and conditions at the end of each Flow Sheet, corresponds to the example illustrating the reaction involved.

Formation of side chain carboxyl from acetals, esters and ethers

One method of synthesizing these compounds is to synthesize the entire indole molecule with either an aldehyde acetal or an alcohol ether or ester group in place of the carboxy function in the side chain. The latter is then hydrolyzed and oxidized into the carboxy.

The use of acetals is shown in A of Flow Sheet I. Acetals of levulinaldehyde are used as one of the starting materials in the Fischer indole synthesis. The resulting indolyl-3-acetaldehyde derivative is then acylated easily in the 1-position. Hydrolysis of the 1-acyl indolyl acetaldehyde acetal yields the corresponding aldehyde which is readily oxidized in acid solution (where the 1-acyl group is stable) by strong oxidizing agents such as $KMnO_4$, dichromates, peroxides, $CrO_3$ in acetic acid, oxygen over $PrO_2$, and the like, to yield the desired indolyl acetic acid products.

Both the aldehydes and the acetal precursors are embodiments of this invention, because of their importance in the synthesis of the anti-inflammatory indolyl acids. The acetals can be any alkyl (such as methyl, ethyl, propyl, butyl, t-butyl, octyl, lauryl or octadecyl), alkenyl (such as allyl, crotyl) aralkyl (such as benzyl and substituted benzyl) cyclic such as alkylene (ethylene, propylene) or cycloalkyl (such as cyclohexyl, cyclopentyl and the like). Preferably, it is lower alkyl. Levulinaldehyde acetals are well known in many cases and the same preparative methods are usable for any of these cetals. Preferably a lower alkyl acetal such as methyl, ethyl or butyl is used. The acetals and the aldehydes produced therefrom can also have biological activity of their own but they are especially useful as intermediates for the acids.

When an etherified 5-keto-primary alcohol is used in the indole synthesis, a similarly advantageous synthesis is achieved and the intermediate ethers and alcohols are similarly embodiments of this invention. The etherifying group can be an alkyl, especially a lower alkyl, an alkenyl, cycloalkyl or aralkyl. Especially preferred as etherifying groups are those having a tertiary carbon bonded to the oxygen, since these decompose readily in acid solution on heating. Examples are t-butyl and trityl (triphenylmethyl). Also preferred is benzyl, which can be removed by hydrogenation. Removal of protecting groups in the side chain is always a problem with the 1-acyl group being sensitive to the usual treatments.

The ethers are also prepared by condensing a gamma chloro or bromo propyl ketone with the appropriate hydrazine in the indole synthesis. The resultant 3-chloroethyl indole is reacted with the appropriate alkali alcoholate to form the ether.

The esters of the 5-keto alcohols can similarly be used as an intermediate in place of the ethers. The esterifying group can be any alkanoic acid (e.g., formyl, acetyl, propionyl, butyryl, stearyl, etc.) or an aromatic acid such as benzoic, thenoic, furoic, nicotinic and the like or an unsaturated acid such as crotonic, acrylic and the like. A lower alkanoic acid residue is preferred.

The esters can also be prepared from the alcohols by esterification with the appropriate acid chloride. This method may be convenient when these indolylethyl esters are the products specifically desired for their biological activity. However, when the indolylacetic acids are desired, the esters are prepared by the Fischer Indole synthesis and the alcohol prepared from them after acylation.

1-acylindoxyls as intermediates

Another method of preparing the 1-aroylindolyl-3-alkanoic acid compounds which forms a still further embodiment comprises the synthesis of 3-ketoindolines and the introduction, by means of the keto groups, of the side chain into the heterocyclic ring. These 3-ketoindolines or indoxyls form a further embodiment of this invention. This is accomplished by several routes as illustrated in Flow Sheet II. A 1-acyl-2,5-substituted 3-keto indoxyl can be synthesized as a key starting material (which is one of the embodiments of this invention) by several series of reactions, one of which is shown in Flow Sheet II. Introduction of the side chain is accomplished by one of several well-known methods, namely the Reformatsky Reaction, the Wittig Reaction, Grignard Reaction and the malonic ester or cyano acetic ester or acid syntheses. The keto is replaced with the desired ester side chain. When the ester used in any of these reactions is the tertiary butyl ester, the process of migrating the exo double bond in the case of the Wittig Reaction or of dehydrating the 3-hydroxyl in the case of the Reformatsky Reaction or Grignard Reaction simultaneously pyrolyzes off the tertiary butyl group to form directly the compounds of Formula IX. If other esters are present, the esters of Formula VIIIa are formed instead and these are converted either by the methods indicated in the Flow Sheets to the indolyl acid compounds. In the case of the cyano acetic ester synthesis, the intermediate is not isolated but goes on to the 3-indolyl alkyl cyanide, another intermediate which is an embodiment of this invention, whose conversion to the corresponding esters and finally to the acid is described in Flow Sheet III. In the case of malonic esters, one uses the t-butyl mixed ester and gets a 3-indolyl alkanoic acid ester directly. These esters are transformed to the acids by enzymatic hydrolysis or (when they are t-butyl esters) by pyrolysis.

Synthesis through the nitrile

Another alternative method of preparing the anti-inflammatory indolyl-3-acetic acid compounds is the reaction of a para substituted phenyl hydrazine with a levulino-nitrile to form a 2,5-substituted-3-indolyl alkyl nitrile. This can then be readily acylated in the 1-position. The nitrile can then be converted into the indolyl-3-alkanoic acids by enzymatic hydrolysis directly to the free acid. The enzymatic hydrolysis is carried out by using nitrilase, found in the leaves of barley, oats, cabbage, cauliflower, brussel sprouts, etc. This enzyme has the power to hydrolyze nitriles directly to the carboxylic acids (Thimann et al., Angen. Chem. Internat. Edit. 1 118 (1962)). The nitrilase is extracted with 0.1 M phosphate buffer at pH 7.5 from the leaves of oats or barley. Ten to 50 g. are obtained per 100 ml. of buffer. The nitrile and enzyme is dissolved in methanol to give 10–20% methanol in the final 0.1–10% enzyme-nitrile substrate solution. Hydrolysis is carried out by stirring at room temperature, keeping the pH at 7–8.0 by the addition of alkali.

Because the use of the nitrile permits acylation in the 1-position and conversion of the side chain into an acid side chain with great ease, avoiding the difficulties encountered when the acylation is carried out on an acid ester side chain and the ester must be removed without touching the 1-acyl group, these 3-cyano methyl indoles are important intermediates and, as such, an additional embodiment of this invention.

FLOW SHEET I

Synthesis Through Acetals and Ethers

A.

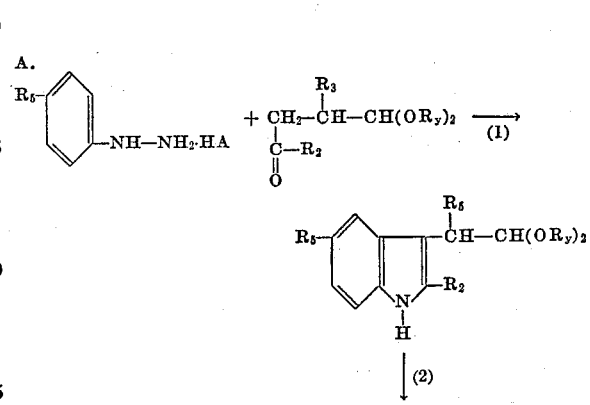

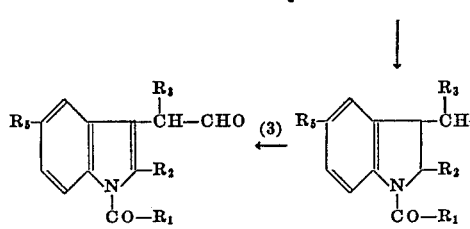

B.

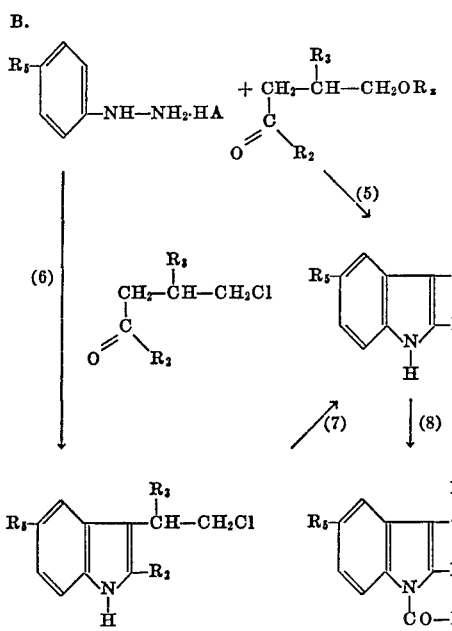

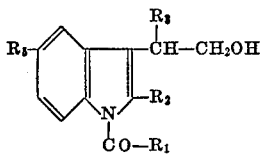

Equivalents:

$R_1$, $R_2$, $R_3$ and $R_5$ as defined in specifications.

$R_y$=alkyl, alkenyl, aralkyl, cycloalkyl, substituted alkyl, preferably lower alkyl.

$R_z$=alkyl, aralkyl, especially t-butyl, benzyl and trityl.

(1) Reflux under nitrogen in an inert solvent such as t-butanol.

(2) Heating in an inert solvent with NaH, followed by cooling below room temperature and addition of an acid halide of $R_1COOH$.

(3) Hydrolysis in dilute acid at room temperature.

(4a) Oxidation by $Ag_2O$ in an inert solvent such as benzene.

(4b) Oxidation by oxygen over $PtO_2$ in anhydrous solvent such as dioxane.

(5) Heating in t-butanol or other solvent under inert atmosphere.

(6) Heating in inert atmosphere in t-butanol or other solvent.

(7) Heating with an alkali alcoholate, using excess alcohol as the solvent.

(8) Heating in inert solvent such as benzene with NaH, followed by low temperature addition of an acid halide of $R_1COOH$.

(9) Hydrogenation of benzyl ether or trityl ether in inert solvent such as ethylacetate in presence catalyst such as Pd on C.

(10) Treatment of t-butyl ether with a strong anhydrous acid in the cold (e.g. $CF_3COOH$ at 10° C.).

(11) Treatment of trityl ether with dry HCl in inert solvent (cyclohexane) in the cold.

(12) Oxidation with $CrO_3$ in acetic acid at low temperature (10–25° C.).

Reagents:

(13) Reaction with an α-halo acid

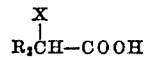

in the presence of an acid binder such as a carbonate.

(14) Acylation by an acid halide of $R_1COOH$ in an organic base such as pyridine.

(15) Acetic anhydride and $R_2$—$CH_2$—COOH at reflux.

(16) Refluxing with aqueous dioxane solution of sulfite (e.g. $Na_2SO_3$).

(17) Heating with a malonic acid in an organic base (e.g. pyridine) followed by heating the intermediate XLII in an inert solvent with a strong acid.

(18) Reformatsky Reaction with an α-halo ester such as

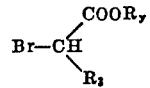

using zinc catalyst at elevated temperatures in an inert solvent (e.g. refluxing in a benzene-ether mixture).

(19) Heating to 100° in an inert solvent (e.g. toluene) with a small amount of strong acid (e.g. p-toluene sulfonic acid).

(20) Wittig Reaction with

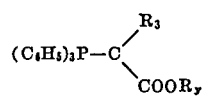

by heating in an inert solvent such as $CH_2Cl_2$.

(21) Heating to 100° in an inert solvent (e.g. toluene) witth a strong acid (e.g. p-toluene sulfonic acid).

(22) Grignard Reaction with Cl—Mg—CH—$COOR_x$ in inert solvent (e.g., petroleum ether) followed by addition of cold $NH_4Cl$ solutions.

(23) Refluxing with cyanoacetic acid or malonic acid in an inert solvent followed by dry HCl and anhydrous $R_xOH$.

FLOW SHEET II

Synthesis Through Indoxyl

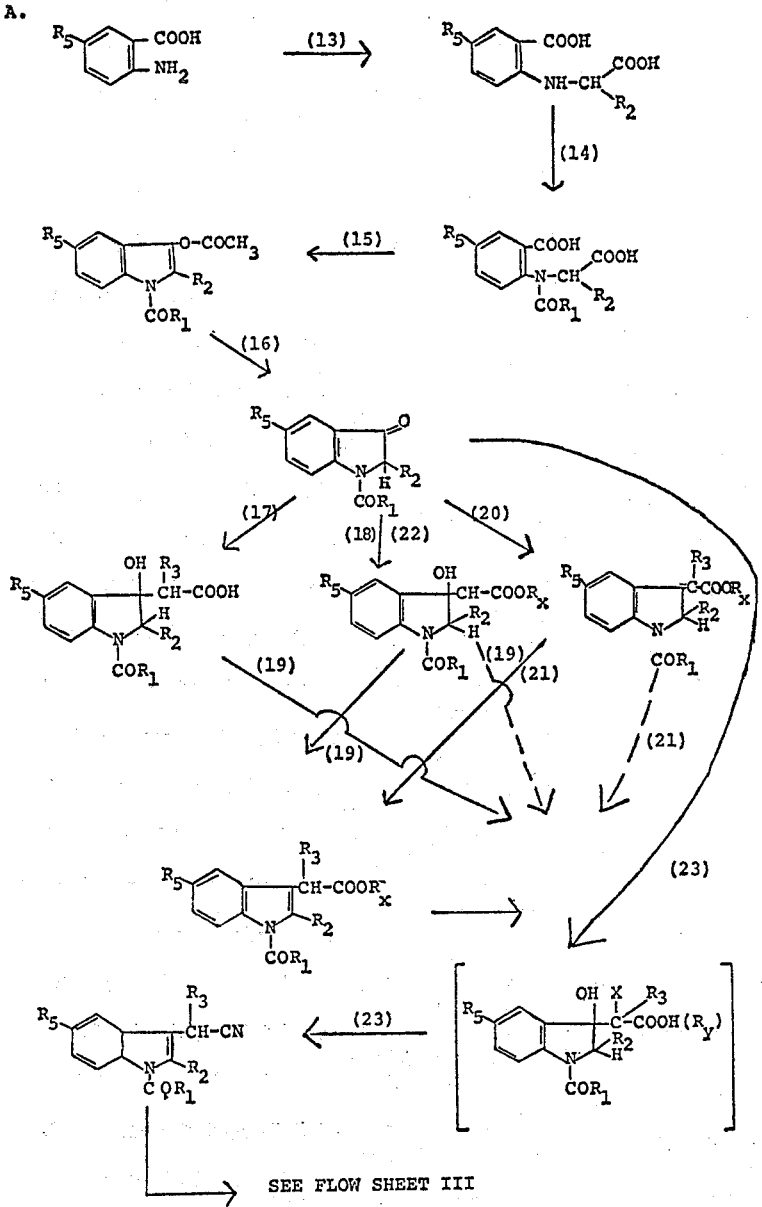

FLOW SHEET III

Synthesis through the nitrile

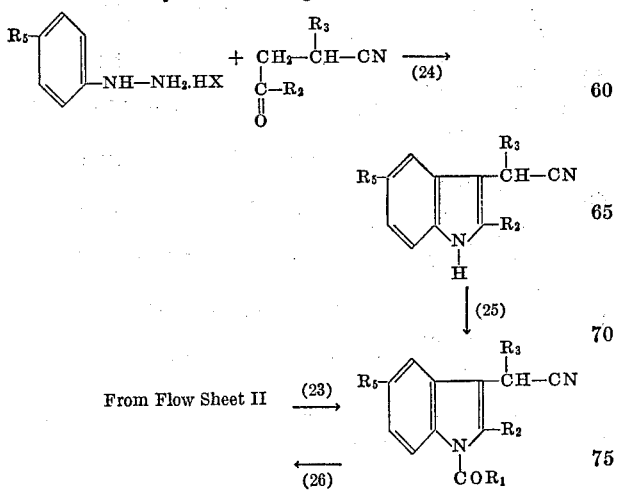

Equivalents:
$R_1$, $R_2$, $R_3$ and $R_5$ as defined in specifications HX in LXXVII shows mineral acid salt (e.g. HCl).

Reagents:
(24) Alcoholic solution at elevated temperature (steam bath).

(25) Heat with NaH in an inert solvent (e.g. toluene), then cool below room temperature and add an acid halide of RCOOH.

(26) Microbiological hydrolysis with nitrilase as catalyst.

EXAMPLE 1

A mixture of 16.8 g. of the dimethylacetal of levulinaldehyde, 17.4 g. of p-methoxyphenyl hydrazine HCl and 120 ml. of t-butanol is heated at reflux under nitrogen for 5 hours. The product is precipitated by the addition of 120 ml. of water followed by cooling to 0–5°. The product is filtered, washed with 20 ml. of 50% aqueous t-butanol and 35 ml. of water. Vacuum drying at 45–50° gives 19.1 g. (80%) of 2-methyl-5-methoxy indolyl acetaldehyde dimethylacetal.

EXAMPLE 2

To a slurry of 5.5 g. of 50% sodium hydride emulsion in 160 ml. of dry benzene is added 19.1 g. of 2-methyl-5-methoxyindolylacetaldehyde dimethyl acetal. The mixture is heated at 80° over a period of 30 minutes. After the evolution of hydrogen is complete the mixture is cooled to 8° and 16.8 g. of p-chlorobenzoyl chloride is added, over a period of 30 minutes at 8–12°. After aging at 10° for one hour, 7.2 ml. of acetic acid is added dropwise at 10° over a period of 30 minutes. Sodium chloride is removed by filtration and the benzene solution is concentrated to a small volume. Addition of petroleum ether precipitates the product which is filtered, washed with benzene-petroleum ether, and petroleum-ether. Vacuum drying at 45° gives 22.6 g. of 1-p-chlorobenzoyl-2-methyl-5-methoxyindolyl acetaldehyde dimethylacetal.

Similarly, when the diethyl, dibutyl, diallyl or dibenzyl acetals of levulinaldehyde are used in equivalent quantities in the procedure of Example 1 and the product is acylated by the procedure of this example, the corresponding indolyl acetaldehyde acetals are prepared.

Similarly, when the appropriately substituted phenyl hydrazines and gamma keto aldehyde dimethyl acetals are used in the procedure of Example 1 and the appropriate acid chloride or p-nitrophenyl ester is used to acylate the intermediate indole, there is obtained the dimethyl acetals of the following aldehydes:

α-(1-p-methylthiobenzoyl-2-methyl-5-methoxy-3-indolyl) propionaldehyde;
α-(1-o-methyl-p-methylthiobenzoyl-2-methyl-5-methoxy-3-indolyl)propionaldehyde;
α-(1-benzoyl-2-methyl-5-methoxy-3-indolyl)propionaldehyde;
1-benzoyl-2-methyl-5-methoxy-3-indolyl acetaldehyde;
α-(1-p-fluorobenzoyl-2-methyl-5-methoxy-3-indolyl) propionaldehyde;
α-(1-p-trifluoromethylbenzoyl-2-methyl-5-methoxy-3-indolyl)propionaldehyde;
1-(3,4,5-trimethoxybenzoyl)-2-methyl-5-methoxy-3-indolyl acetaldehyde;
1-(p-phenoxybenzoyl)-2-methyl-5-methoxy-3-indolyl acetaldehyde;
1-(p-trifluoroacetylbenzoyl)-2-methyl-5-methoxy-3-indolyl acetaldehyde;
1-(p-N,N-dimethylsulfamylbenzoyl)-2-methyl-5-methoxy-3-indolyl acetaldehyde;
1-(3-furoyl)-2-methyl-5-methoxy-3-indolyl acetaldehyde;
1-(methylimidazol-5-carboxy)-2-methyl-5-methoxy-3-indolyl acetaldehyde;
1-(1,3-dimethyl-2,3-dihydro-2-oxoimidazole-4-carboxy)-2-methyl-5-methoxy-3-indolyl acetaldehyde;
1-isonicotinyl-2-methyl-5-methoxy-3-indolyl acetaldehyde;
1-(p-chlorobenzoyl)-2-methyl-5-nitro-3-indolyl acetaldehyde;
1-(methylbenzimidazole-2-carboxy)-2-methyl-5-methoxy-3-indolyl acetaldehyde;
1-(5-fluoro-2-thenoyl)-2-methyl-5-methoxy-3-indolyl acetaldehyde;
1-(3-thenoyl)-2-methyl-5-methoxy-3-indolyl acetaldehyde;
1-(5-nitro-2-furoyl)-2-methyl-5-methoxy-3-indolyl acetaldehyde;
1-(1-methylindazole-3-carboxy)-2-methyl-5-methoxy-3-indolyl acetaldehyde;
1-(1-methyl-6-nitroindazole-3-carboxy)-2-methyl-5-methoxy-3-indolyl acetaldehyde;
1-(oxazole-4-carboxy)-2-methyl-5-methoxy-3-indolyl acetaldehyde;
1-(benzoxazole-2-carboxy)-2-methyl-5-methoxy-3-indolyl acetaldehyde;
1-(thiazole-4-carboxy)-2-methyl-5-methoxy-3-indolyl acetaldehyde;
1-(thiazole-2-carboxy)-2-methyl-5-methoxy-3-indolyl acetaldehyde;
1-(2-phenylthiazole-4-carboxy)-2-methyl-5-methoxy-3-indolyl acetaldehyde;
1-(2-benzylmercaptothiazole-4-carboxy)-2-methyl-5-methoxy-3-indolyl acetaldehyde;
1-(p-acetylbenzoyl)-2-methyl-5-methoxy-3-indolyl acetaldehyde;
1-(N,N-dimethyl-p-carboxamidobenzoyl)-2-methyl-5-methoxy-3-indolyl acetaldehyde;
1-(p-cyanobenzoyl)-2-methyl-5-methoxy-3-indolyl acetaldehyde;
1-(p-carbomethoxybenzoyl)-2-methyl-5-methoxy-3-indolyl acetaldehyde;
1-(p-formylbenzoyl)-2-methyl-5-methoxy-3-indolyl acetaldehyde;
1-(p-trifluoromethylthiobenzoyl)-2-methyl-5-methoxy-3-indolyl acetaldehyde;
1-(N,N-dimethyl-p-sulfonamidobenzoyl)-2-methyl-5-methoxy-3-indolyl acetaldehyde;
1-(p-methylsulfinylbenzoyl)-2-methyl-5-methoxy-3-indolyl acetaldehyde;
1-(p-methylsulfonylbenzoyl)-2-methyl-5-methoxy-3-indolyl acetaldehyde;
1-(p-benzylthiobenzoyl)-2-methyl-5-methoxy-3-indolyl acetaldehyde;
1-(p-mercaptobenzoyl)-2-methyl-5-methoxy-3-indolyl acetaldehyde;
1-(p-nitrobenzoyl)-2-methyl-5-methoxy-3-indolyl acetaldehyde;
1-(p-dimethylaminobenzoyl)-2-methyl-5-methoxy-3-indolyl acetaldehyde;
1-(p-acetaminobenzoyl)-2-methyl-5-methoxy-3-indolyl acetaldehyde;
1-(o-fluoro-p-chlorobenzoyl)-2-methyl-5-methoxy-3-indolyl acetaldehyde;
1-(o-methoxy-p-chlorobenzoyl)-2-methyl-5-methoxy-3-indolyl acetaldehyde;
1-(o-hydroxy-p-chlorobenzoyl)-2-methyl-5-methoxy-3-indolyl acetaldehyde;
1-(2,4,5-trichlorobenzoyl)-2-methyl-5-methoxy-3-indolyl acetaldehyde;
1-(p-chlorobenzoyl)-2-methylamino-3-indolyl acetaldehyde;
1-(p-chlorobenzoyl)-2-methyl-1'-pyrrolidino-3-indolyl acetaldehyde;
1-(p-chlorobenzoyl)-2-methyl-5-dimethylamino-3-indolyl acetaldehyde;
1-(p-chlorobenzoyl)-2-methyl-5-acidamino-3-indolyl acetaldehyde;
1-(p-chlorobenzoyl-2-methyl-5N-methyl acetamino-3-indolyl acetaldehyde;
1-(p-chlorobenzoyl)-2-methyl-5-bis-β-hydroxyethyl-amino-3-indolyl acetaldehyde;
1-(p-chlorobenzoyl)-2-methyl-5(4'-methyl-1'-piperazinyl) 3-indolyl acetaldehyde;
1-(p-chlorobenzoyl)-2-methyl-(4'-morpholinyl)-3-indolyl acetaldehyde;
1-(p-chlorobenzoyl)-2-methyl-5-cyano-3-indolyl acetaldehyde;
1-(p-chlorobenzoyl)-2-methyl-5-aminomethyl-3-indolyl acetaldehyde;
1-(p-chlorobenzoyl)-2-methyl-5-dimethylaminomethyl-3-indolyl acetaldehyde;
α-(1-p-methylmercaptobenzoyl-2-methyl-5-methoxy-3-indolyl) butyraldehyde;
α-(1-benzoyl-2-methyl-5-methoxy-3-indolyl) acrylaldehyde;
α-(1-benzoyl-2-methyl-5-methoxy-3-indolyl) cyclopropylaldehyde;
1-(1-methylpyrryl-2-carboxy)-2-methyl-5-methoxy-3-indolyl acetaldehyde;
1-(5-methylpyrazole-3-carboxy)-2-methyl-5-methoxy-3-indolyl acetaldehyde;

1-(1,5-dimethyl-4-bromopyrazole-3-carboxy)-2-methyl-5-methoxy-3-indolyl acetaldehyde;
1-(1-phenylpyrazole-4-carboxy)-2-methyl-5-methoxy-3-indolyl acetaldehyde;
1-(1-phenyl-5-pyrazolone-3-carboxyl)-2-methyl-5-methoxy-3-indolyl acetaldehyde;
1-(2-phenyl-5-methyloxazole-3-carboxy)-2-methyl-5-methoxy-3-indolyl acetaldehyde;
1-(5-phenylisoxazole-3-carboxy)-2-methyl-5-methoxy-3-indolyl acetaldehyde;
1-(1,2-benzoisothiazole-3-carboxy)-2-methyl-5-methoxy-3-indolyl acetaldehyde;
1-(1,2,3-thiadiazole-4-carboxy)-2-methyl-5-methoxy-3-indolyl acetaldehyde;
1-(1-methyl-1,2,3,-triazole-4-carboxy)-2-methyl-5-methoxy-3-indolyl acetaldehyde;
1-nicotinoyl-2-methyl-5-methoxy-3-indolyl acetaldehyde;
1-picolinoyl-2-methyl-5-methoxy-3-indolyl acetaldehyde;
1-isonicotinoyl-2-methyl-5-methoxy-3-indolyl acetaldehyde;
1-(3-chloroisonicotinoyl)-2-methyl-5-methoxy-3-indolyl acetaldehyde;
1-(6-methoxynicotinoyl)-2-methyl-5-methoxy-3-indolyl acetaldehyde;
1-(6-phenylnicotinoyl)-2-methyl-5-methoxy-3-indolyl acetaldehyde;
1-(α-pyrone-5-carboxy)-2-methyl-5-methoxy-3-indolyl acetaldehyde;
1-(pyridazine-4-carboxy)-2-methyl-5-methoxy-3-indolyl acetaldehyde;
1-(3-keto-4-methyl-2-phenyl-2,3-dihydropyridazine-6-carboxy)-2-methyl-5-methoxy-3-indolyl acetaldehyde;
1-(cinnoline-4-carboxy)-2-methyl-5-methoxy-3-indolyl acetaldehyde;
1-(2-methylmercapto-4-chloropyrimidine-5-carboxy)-2-methyl-5-methoxy-3-indolyl acetaldehyde;
1-(2,4-dichloropyrimidine-5-carboxy)-2-methyl-5-methoxy-3-indolyl acetaldehyde;
1-pyrazinoyl-2-methyl-5-methoxy-3-indolyl acetaldehyde;
1-(5-methoxypyrazinoyl)-2-methyl-5-methoxy-3-indolyl acetaldehyde;
1-p-difluoromethoxybenzoyl)-2-methyl-5-methoxy-3-indolyl acetaldehyde;
α-(1-p-chlorobenzoyl)-2-methyl-5-ethoxy-3-indolyl propionaldehyde;
α-(1-p-chlorobenzoyl)-2-methyl-5-propoxy-3-indolyl propionaldehyde;
α-(1-p-chlorobenzoyl)-2-methyl-5-butoxy-3-indolyl propionaldehyde;
α-(1-p-chlorobenzoyl)-2-methyl-5-ethyl-3-indolyl propionaldehyde;
α-(1-p-chlorobenzoyl)-2-methyl-5-butyl-3-indolyl propionaldehyde;
α-(1-p-chlorobenzoyl)-2-methyl-5-fluoro-3-indolyl propionaldehyde;
1-(1-p-bromobenzoyl)-2-methyl-5-methoxy-3-indolyl acetaldehyde;
1-(1-p-phenylbenozyl)-2-methyl-5-methoxy-3-indolyl acetaldehyde;
1-(1-p-acetoxybenzoyl)-2-methyl-5-methoxy-3-indolyl acetaldehyde;
1-(1,4-thiazolylcarboxy)-2-methyl-5-methoxy-3-indolyl acetaldehyde;
1-(2-thenoyl)-2-methyl-5-methoxy-3-indolyl acetaldehyde;
1-(α-naphthoyl)-2-methyl-5-methoxy-3-indolyl acetaldehyde;
1-(1-p-benzyloxybenzoyl)-2-methyl-5-methoxy-3-indolyl acetaldehyde;
1-(1-p-hydroxybenzoyl)-2-methyl-5-methoxy-3-indolyl acetaldehyde;
1-(1-o-fluorobenzoyl)-2-methyl-5-methoxy-3-indolyl acetaldehyde;
1-(β-naphthoyl)-2-methyl-5-methoxy-3-indolyl acetaldehyde;
1-(5-chlorobenzoyl)-2-methyl-5-methoxy-3-indolyl acetaldehyde;
1-(5-chloro-2-thenoyl)-2-methyl-5-methoxy-3-indolyl acetaldehyde;
1-(1-p-trifluoromethylbenzoyl)-2-methyl-5-methoxy-3-indolyl acetaldehyde;
1-(o-p-dichlorobenzoyl)-2-methyl-5-methoxy-3-indolyl acetaldehyde;
α-(1-p-chlorobenzoyl)-2-methyl-5-p-dimethylsulfonamido-3-indolyl propionaldehyde;
α-(1-p-chlorobenzoyl)-2-methyl-5-benzylmercapto-3 indolyl propionaldehyde;
α-(1-p-chlorobenzoyl)-2-methyl-5-vinyl-3-indolyl propionaldehyde.

EXAMPLE 3

1-p-chlorobenzoyl-2-methyl-5-methoxy-3-indolyl acetaldehyde

Crude 1-p-chlorobenzoyl-2-methyl-5-methoxyindole-3-acetaldehydediethylacetal (3.0 g.) is stirred with 60 ml. of water-alcohol (1:1) and 3 ml. of concentrated hydrochloric acid for 4 hours at 25° C. to obtain the corresponding free aldehyde which is isolated by dilution with 300 ml. of water and ether extraction. After removal of the solvent, the product remains in the residue.

When any of the other aldehyde acetals shown in Example 2 are similarly treated, the corresponding free aldehydes are obtained.

EXAMPLE 4

(a) To a solution of 2.82 g. of 1-p-chlorobenzoyl-2-methyl-5-methoxyindole-3-acetaldehyde in 10 ml. benzene, 2.4 g. of silver oxide is added portionwise, maintaining the temperature at 35° to 40° C. by external cooling. After three hours aging period, the silver salt of 1-p-chlorobenzoyl-2-methyl-5-methoxyindole-3-acetic acid is filtered and dried in vacuo. The free acid is liberated from the aqueous solution of the silver salt by addition of acidic acid. The crude product is purified by crystallization from t-butanol and found to be identical with standard sample of 1-p-chlorobenzoyl-2-methyl-5-methoxyindole-3-acetic acid.

(b) To a solution of 2.82 g. of 1-p-chlorobenzoyl-2-methyl-5-methoxyindole-3-acetaldehyde in 5 ml. of anhydrous dioxan, 0.5 g. hydrogenated platinum-on-charcoal is added. The mixture is heated to 40° C. and shaken in oxygen atmosphere until the theoretical amount of oxygen is absolved (approximately 2 hours). After the filtration the catalyst is removed in vacuo and the residue recrystallized from t-butanol.

The product has a melting point of 165° C. and shows no depression with sample of 1-p-chlorobenzoyl-2-methyl-5-methoxyindole-3-acetic acid. The I.R. and U.V. spectrums are identical with standard sample.

EXAMPLE 5

(a) A mixture of 17.4 g. of p-methoxyphenylhydrazine HCl, 39 g. of the trityl ether of 4-keto pentanol and 120 ml. of t-butanol is heated at reflux under nitrogen for 5 hours. Addition of 120 ml. of water and cooling to 0–5° precipitates the product which is filtered, washed with 20 ml. of 50% aqueous t-butanol and 35 ml. of water. Vacuum drying at 45° gives 32.6 g. of the trityl 2-methyl-5-methoxyindolyl-3-ethyl ether.

(b) A mixture of 19.2 g. of benzyl ether of 4-keto pentanol, 17.4 g. of p-methoxyphenylhydrazine HCl and 120 ml. of t-butanol is heated at reflux under nitrogen for 5 hours. Addition of 120 ml. of water and cooling precipitates the benzyl indolyl ethyl ether which is filtered, washed with 20 ml. of 50% aqueous t-butanol and 35 ml. of water. Vacuum drying at 50° gives 25 g. of the benzyl ether of 2-methyl-5-methoxyindolyl ethanol.

EXAMPLE 6

A mixture of 17.4 g. of p-methoxyphenylhydrazine HCl, 12 g. of 1-chloropentanone-4, 250 ml. of absolute ethanol and 13 ml. of 7.8 N ethanolic hydrogen chloride is heated at reflux for 30 minutes. The mixture is concentrated to 75 ml. and the 2-methyl-5-methoxy-3-chlorethylindole is crystallized by the addition of 75 ml. of water. Yield: 14.5 g.

EXAMPLE 7

Sodium (1.5 g.) is reacted with 20 g. of benzyl-alcohol in 150 ml. of benzene and 11.1 g. of 2-methyl-5-methoxy-3-chlorethylindole from Example 6 is added. The mixture is heated at reflux for 1 hour, washed with water and concentrated to small volume. Addition of petroleum ether precipitates the product.

EXAMPLE 8

(a) To a slurry of 5.2 g. of 50% sodium hydride emulsion in 150 ml. of dry benzene is added 32 g. of the trityl indole ether prepared in Example 5a. The mixture is heated to 80° over a period of 30 minutes and held at 80° until no more hydrogen is evolved. The mixture is cooled to 8° and 15.7 g. of p-chlorobenzoyl chloride is added at 8–10° in 30 minutes. After aging at 8–10° for one hour, 6.7 ml. of acetic acid is added dropwise over a period of 20 minutes at 10°. The sodium chloride formed is removed by filtration and the product is crystallized by concentration to a small volume and the addition of hexane. The trityl 1-p-chlorobenzoyl-2-methyl - 5 - methoxyindolyl-3-ethyl ether so produced is filtered, washed with hexane and dried at 50° in vacuum. Yield: 35 g.

(b) To a slurry of 5.5 g. of 50% sodium hydride emulsion in 160 ml. of dry benzene is added 23.6 g. of dry benzene, 23.6 g. of the benzyl indolyl ethyl ether produced in Example 5b. The mixture is heated to reflux over a period of 30 minutes and held at reflux until no hydrogen evolution is noted. After cooling the mixture to 8°, 16.8 g. of p-chlorobenzoylchloride is added dropwise over a period of 30 minutes at 8–12°. The slurry is aged at 8–10° for one hour and the 7.2 ml. of acetic acid is added dropwise at 8–10° over a period of 30 minutes. Sodium chloride is removed by filtration and the solvent removed in vacuum. The benzyl ether of 1-p-chlorobenzoyl-2-methyl-5-methoxy-3-indolyl ethanol is crystallized from cyclohexane to give 26 g. yield.

(c) When the procedure of Examples 5a and 8a are followed using equivalent quantities of the t-butyl, methyl, ethyl, lauryl, octadecyl, alkyl or crotyl delta ketopentyl ethers, the corresponding ethers of 1-p-chlorobenzoyl - 2 - methyl-3-hydroxyethyl-5-methoxyindole are obtained.

Similarly, when the procedure of Example 7 is used, substituting methanol, ethanol, t-butanol, lauryl alcohol, octadecanol, allyl alcohol and crotyl alcohol for the benzyl alcohol, the corresponding ethers of 2-methyl-3-hydroxyethyl-5-methoxyindole are obtained. When any of the products of Example 7 are acylated by the procedure of Example 8a, the corresponding 1-acyl indole ether is obtained.

(d) When the procedures of Examples 5 and 8a or 6, 7, and 8a are followed, using the appropriately substituted phenylhydrazines and keto ethers or chloroketones followed by the appropriate sodium alcoholates and the appropriate acid halides, all in equivalent quantities, there are obtained the benzyl, t-butyl or trityl ethers of the following indolyl alcohols:

β-[(1-p-methylthiobenzoyl)-2-methyl-5-methoxy-3-indolyl] propanol;
β-[(1-o-methyl-p-methylthiobenzoyl)-2-2-methyl-5-methoxy-3-indolyl] propanol;
β-[(1-benzoyl)-2-methyl-5-methoxy-3-indolyl] propanol;
β-[(1-benzoyl)-2-methyl-5-methoxy-3-indolyl] ethanol;
β-[(1-p-fluorobenzoyl)-2-methyl-5-methoxy-3-indolyl] propanol;
β-[(1-p-trifluoromethylbenzoyl)-2-methyl-5-methoxy-3-indolyl] propanol;
β-[(1,3,4,5-trimethoxybenzoyl)-2-methyl-5-methoxy-3-indolyl] ethanol;
β-[(1-p-phenoxybenzoyl)-2-methyl-5-methoxy-3-indolyl] ethanol;
β-[(1-p-trifluoroacetylbenzoyl)-2-methyl-5-methoxy-3-indolyl] ethanol;
β-[(1-p-N,N-dimethylsulfamylbenzoyl)-2-methyl-5-methoxy-3-indolyl] ethanol;
β-[(1,3-furoyl)-2-methyl-5-methoxy-3-indolyl] ethanol;
β-[(1-methylimidazol-5-carboxy)-2-methyl-5-methoxy-3-indolyl] ethanol;
β-[(1,3-dimethyl-2,3-dihydro-2-oxoimidazole-4-carboxy)-2-methyl-5-methoxy-3-indolyl] ethanol;
β-[(1-isonicotinyl)-2-methyl-5-methoxy-3-indolyl] ethanol;
β-[(1-p-chlorobenzoyl)-2-methyl-5-nitro-3-indolyl] ethanol;
β-[(1-methylbenzimidazole-2-carboxy)-2-methyl-5-methoxy-3-indolyl] ethanol;
β-[(5-fluoro-2-thenoyl)-2-methyl-5-methoxy-3-indolyl] ethanol;
β-[(3-thenoyl)-2-methyl-5-methoxy-3-indolyl] ethanol;
β-[(5-nitro-2-furoyl)-2-methyl-5-methoxy-3-indolyl] ethanol;
β-[(1-methylindazole-3-carboxy)-2-methyl-5-methoxy-3-indolyl] ethanol;
β-[(1-methyl-6-nitroindazole-3-carboxy)-2-methyl-5-methoxy-3-indolyl] ethanol;
β-[(oxazole-4-carboxy)-2-methyl-5-methoxy-3-indolyl] ethanol;
β-[(benzoxazole-2-carboxy)-2-methyl-5-methoxy-3-indolyl] ethanol;
β-[(thiazole-4-carboxy)-2-methyl-5-methoxy-3-indolyl] ethanol;
β-[(thiazole-2-carboxy)-2-methyl-5-methoxy-3-indolyl] ethanol;
β-[(2-phenylthiazole-4-carboxy)-2-methyl-5-methoxy-3-indolyl] ethanol;
β-[(2-benzylmercaptothiazole-4-carboxy)-2-methyl-5-methoxy-3-indolyl] ethanol;
β-[(p-acetylbenzoyl)-2-methyl-5-methoxy-3-indolyl] ethanol;
β-[(N,N-dimethyl-p-carboxamidobenzoyl)-2-methyl-5-methoxy-3-indolyl] ethanol;
β-[(p-cyanobenzoyl)-2-methyl-5-methoxy-3-indolyl] ethanol;
β-[(p-carbomethoxybenzoyl)-2-methyl-5-methoxy-3-indolyl] ethanol;
β-[(p-formylbenzoyl)-2-methyl-5-methoxy-3-indolyl] ethanol;
β-[(p-trifluoromethylthiobenzoyl)-2-methyl-5-methoxy-3-indolyl] ethanol;
β-[N,N-dimethyl-p-sulfonamidobenzoyl)-2-methyl-5-methoxy-3-indolyl] ethanol;
β-[(p-methylsulfinylbenzoyl)-2-methyl-5-methoxy-3-indolyl] ethanol;
β-[(p-methylsulfonylbenzoyl)-2-methyl-5-methoxy-3-indolyl] ethanol;
β-[(p-benzylthiobenzoyl)-2-methyl-5-methoxy-3-indolyl] ethanol;
β-[(p-mercaptobenzoyl)-2-methyl-5-methoxy-3-indolyl] ethanol;
β-[(p-nitrobenzoyl)-2-methyl-5-methoxy-3-indolyl] ethanol;
β-[(p-dimethylaminobenzoyl)-2-methyl-5-methoxy-3-indolyl] ethanol;
β-[(p-acetaminobenzoyl)-2-methyl-5-methoxy-3-indolyl] ethanol;
β-[(o-fluoro-p-chlorobenzoyl)-2-methyl-5-methoxy-3-indolyl] ethanol;
β-[(o-methoxy-p-chlorobenzoyl)-2-methyl-5-methoxy-3-indolyl] ethanol;

β-[(o-hydroxy-p-chlorobenzoyl)-2-methyl-5-methoxy-3-indolyl] ethanol;
β-[(2,4,5-trichlorobenzoyl)-2-methyl-5-methoxy-3-indolyl] ethanol;
β-[(1-p-chlorobenzoyl)-2-methylamino-3-indolyl] ethanol;
β-[(1-p-chlorobenzoyl)-2-methyl-1'-pyrrolidino-3-indolyl] ethanol;
β-[(1-p-chlorobenzoyl)-2-methyl-5-dimethylamino-3-indolyl] ethanol;
β-[(1-p-chlorobenzoyl)-2-methyl-5-acidamino-3-indolyl] ethanol;
β-[(1-p-chlorobenzoyl)-2-methyl-5N-methyl-acidamino-3-indolyl] ethanol;
β-[(1-p-chlorobenzoyl)-2-methyl-5-bis-β-hydroxyethylamino-3-indolyl] ethanol;
β-[(1-p-chlorobenzoyl)-2-methyl-5-(4'-methyl-1'-piperazinyl)-3-indolyl] ethanol;
β-[(1-p-chlorobenzoyl)-2-methyl-(4'-morpholinyl)-3-indolyl acetaldehyde] ethanol;
β-[(1-p-chlorobenzoyl)-2-methyl-5-cyano-3-indolyl] ethanol;
β-[(1-p-chlorobenzoyl)-2-methyl-5-aminomethyl-3-indolyl] ethanol;
β-[(1-p-chlorobenzoyl)-2-methyl-5-dimethylaminomethyl-3-indolyl] ethanol;
β-[(1-p-methylmercaptobenzoyl)-2-methyl-5-methoxy-3-indolyl] butanol;
β-[(1-benzoyl)-2-methyl-5-methoxy-3-indolyl] allyl alcohol;
α-[(1-benzoyl)-2-methyl-5-methoxy-3-indolyl]-α-hydroxymethyl cyclopropane;
β-[1-(1-methylpyrryl-2-carboxy)-2-methyl-5-methoxy-3-indolyl] ethanol;
β-[1-(5-methylpyrazole-3-carboxy)-2-methyl-5-methoxy-3-indolyl] ethanol;
β-[1-(1,5-dimethyl-4-bromopyrazole-3-carboxy)-2-methyl-5-methoxy-3-indolyl] ethanol;
β-[1-(1-phenylpyrazole-4-carboxy)-2-methyl-5-methoxy-3-indolyl] ethanol;
β[1-(1-phenyl-5-pyrazolone-3-carboxy-[2-methyl-5-methoxy-3-indolyl] ethanol;
β-[1-(2-phenyl-5-methyloxazole-4-carboxyisoxazole-3-carboxy)-2-methyl-5-methoxy-3-indolyl] ethanol;
β-[1-(5-phenylisoxazole-3-carboxy)-2-methyl-5-methoxy-3-indolyl] ethanol;
β-[1-(1,2-benzoisothiazole-3-carboxy)-2-methyl-5-methoxy-3-indolyl] ethanol;
β-[1-(1,2,3-thiadiazole-4-carboxy)-2-methyl-5-methoxy-3-indolyl] ethanol;
β-[1-(1-methyl-1,2,3-triazole-4-carboxy)-2-methyl-5-methoxy-3-indolyl] ethanol;
β-[1-(nicotinoyl)-2-methyl-5-methoxy-3-indolyl] ethanol;
β-[1-(picolinoyl)-2-methyl-5-methoxy-3-indolyl] ethanol;
β-[1-(isonicotinoyl)-2-methyl-5-methoxy-3-indolyl] ethanol;
β-[1-(3-chloroisonicotinoyl)-2-methyl-5-methoxy-3-indolyl] ethanol;
β-[1-(6-methoxynicotinoyl)-2-methyl-5-methoxy-3-indolyl] ethanol;
β-[1-(6-phenylnicotinoyl)-2-methyl-5-methoxy-3-indolyl] ethanol;
β-[1-(α-pyrone-5-carboxy)-2-methyl-5-methoxy-3-indolyl] ethanol;
β-[1-(pyridazine-4-carboxy)-2-methyl-5-methoxy-3-indolyl] ethanol;
β-[1-(3-keto-4-methyl-2-phenyl-2,3-dihydropyridazine-6-carboxy)-2-methyl-5-methoxy-3-indolyl] ethanol;
β-[1-(cinnoline-4-carboxy)-2-methyl-5-methoxy-3-indolyl] ethanol;
β-[1-(2-methylmercapto-4-chloropyrimidine-5-carboxy)-2-methyl-5-methoxy-3-indolyl] ethanol;
β-[1-(2,4-dichloropyrimidine-5-carboxy)-2-methyl-5-methoxy-3-indolyl] ethanol;
β-[1-pyrazinoyl)-2-methyl-5-methoxy-3-indolyl] ethanol;
β-[1-(5-methoxypyrazinoyl)-2-methyl-5-methoxy-3-indolyl] ethanol;
β-[1-(p-difluoromethoxybenzoyl)-2-methyl-5-methoxy-3-indolyl] ethanol;
β-[(1-p-chlorobenzoyl)-2-methyl-5-ethoxy-3-indolyl] propanol;
β-[(1-p-chlorobenzoyl)-2-methyl-5-butoxy-3-indolyl] propanol;
β-[(1-p-chlorobenzoyl)-2-methyl-5-ethyl-3-indolyl] propanol;
β-[(1-p-chlorobenzoyl)-2-methyl-5-butyl-3-indolyl] propanol;
β-[(1-p-chlorobenzoyl)-2-methyl-5-fluoro-3-indolyl] propanol;
β-[1-(1-p-bromobenzoyl)-2-methyl-5-methoxy-3-indolyl] ethanol;
β-[1-(1-p-phenylbenzoyl)-2-methyl-5-methoxy-3-indolyl] ethanol;
β-[1-(1-p-acetoxybenzoyl)-2-methyl-5-methoxy-3-indolyl] ethanol;
β-[1-(1,4-thiazolylcarboxy)-2-methyl-5-methoxy-3-indolyl] ethanol;
β-[1-(1,2-thenoyl)-2-methyl-5-methoxy-3-indolyl] ethanol;
β-[1-(1-α-naphthoyl)-2-methyl-5-methoxy-3-indolyl] ethanol;
β-[1-(1-p-benzyloxybenzoyl)-2-methyl-5-methoxy-3-indolyl] ethanol;
β-[1-(1-p-hydroxybenzoyl)-2-methyl-5-methoxy-3-indolyl] ethanol;
β-[1-(1-o-fluorobenzoyl)-2-methyl-5-methoxy-3-indolyl] ethanol;
β-[1-(1-β-naphthoylbenzoyl)-2-methyl-5-methoxy-3-indolyl] ethanol;
β-[1-(1,5-chlorobenzoyl)-2-methyl-5-methoxy-3-indolyl] ethanol;
β-[1-(1,5-chloro-2-thenoylbenzoyl)-2-methyl-5-methoxy-3-indolyl] ethanol;
β-[1-(1-p-trifluoromethylbenzoyl)-2-methyl-5-methoxy-3-indolyl] ethanol;
β-[1-(1-o-p-dichlorobenzoyl)-2-methyl-5-methoxy-3-indolyl] ethanol;
β-[(1-p-chlorobenzoyl)-2-methyl-5-p-dimethylsulfonamido-3-indolyl] propanol;
β-[1-p-chlorobenzoyl)-2-methyl-5-benzylmercapto-3-indolyl] propanol;
β-[1-p-chlorobenzoyl)-2-methyl-5-vinyl-3-indolyl] propanol.

EXAMPLE 9

(a) A solution of 2.0 g. of 1-p-chlorobenzoyl-2-methyl-5-methoxyindole-3-ethanol benzyl ether in 50 ml. ethylacetate is hydrogenated in the presence of 0.4 g. palladium/charcoal catalyst under one atmosphere of hydrogen. The theoretical amount of hydrogen is taken up (0.5 hour) and after removal the catalyst is evaporated in vacuo. The residue is recrystallized from isopropanol. The product has an infra-red spectrum identical with 1 - p - chlorobenzoyl - 2-methyl-5-methoxyindole-3-ethanol.

(b) A mixture of 5.0 g. of 1 - p - chlorobenzoyl - 2-methyl-5-methoxyindole-3-ethanol trityl ether and 1.0 g. of palladium/charcoal catalyst is shaken at room temperature with hydrogen under slightly more than atmospheric pressure. After the calculated amount of hydrogen is absorbed (3 hours), the catalyst is filtered off and the solvent is removed in vacuo. The residue is crystallized from isopropanol. The product is identical with standard samples of 1-p-chlorobenzoyl-2-methyl-5-methoxyindole-3-ethanol.

EXAMPLE 10

A solution of 2.0 g. of 1-p-chlorobenzoyl-2-methyl-5-methoxyindole-3-ethanol-t-butyl ether, prepared by using the t-butyl ether of 4-ketopentanol in the procedure of Example 5 or sodium t-butoxide in the procedure of Example 7, in 8 ml. of anhydrous trifluoroacetic acid is allowed to stand for one hour at 10° C. The solution is poured into 30 ml. of ice cold water and the mixture is extracted with chloroform. The chloroform extracts are washed with water, saturated sodium bicarbonate solution and finally with water. After drying over $Na_2SO_4$, the solvent is removed in vacuo and the residue recrystallized from isopropanol. The product has an infra-red spectrum identical with 1 - p - chlorobenzoyl-2-methyl-5-methoxyindole-3-ethanol.

EXAMPLE 11

Dry hydrogen chloride is introduced into a solution of 5.0 g. of 1-p-chlorobenzoyl-2-methyl-5-methoxyindole-3-ethanol-trityl ether in 50 ml. of cyclohexane, while cooling with cold water. After 3 hours standing at 25° C., 250 ml. of chloroform is added to the reaction mixture. The solution is washed with water, saturated sodium bicarbonate solution and water, dried over $Na_2SO_4$ and the solvent is distilled off in vacuo. The residue is taken up in 100 ml. of warm petroleum ether. Upon cooling to 10° C. the crystallized butanol is separated by filtration. Petroleum ether is removed in vacuo and the residue crystallized from isopropanol. This product has an infra-red spectrum identical with 1-p-chlorobenzoyl-2-methyl-5-methoxyindole-3-ethanol.

EXAMPLE 12

To a stirred solution of 28.4 g. of 1-p-chlorobenzoyl-2-methyl-5-methoxyindole-3-ethanol in 100 ml. of acetic acid is added 80 ml. of chromic acid solution (made by dissolving 20.1 g. of chromic acid in 20 ml. of water and diluted to 80 ml. with acetic acid) during 1.5 hours at 5° C. After standing overnight at room temperature, 300 ml. of water is added and the precipitated solid is filtered off and purified by crystallization from 5-butanol. This product has an infra-red spectrum identical to 1-p-chlorobenzoyl-2-methyl-5-methoxyindole-3-acetic acid.

EXAMPLE 13

A mixture of 16.7 g. (0.1 mole) of 5-methoxy anthranilic acid, 11.9 g. (0.11 mole) α-chloropropionic acid, 45.6 g. (.43) sodium carbonate and 75 ml. water is stirred under reflux for 12 hours. After addition of another 11.9 g. α-chloropropionic acid and 20 ml. water, reaction is resumed for another 12 hours. After cooling, the product is precipitated with hydrochloric acid (50 ml.) and recrystallized from aqueous acetic acid. It is N-(2-carboxy-4-methoxyphenyl)alanine.

EXAMPLE 14

To 150 ml. pyridine and 31.8 g. are added, with stirring and cooling, first 35 g. (0.2 mole) parachlorobenzoyl chloride, and then 23.9 g. (0.1) N-(2-carboxy-4-methoxyphenyl)alanine. The mixture is heated 4 hours on the steam bath and, after distillation of most of the pyridine in vacuo, it is cooled, diluted slowly with 500 ml. water, and acidified with HCl. The product is extracted into chloroform and after drying ($MgSO_4$) and removal of most of the solvent, N-p-chlorobenzoyl-N-(2-carboxy-4-methoxyphenyl)alanine crystallizes on cooling to 5°.

EXAMPLE 15

A mixture of 37.8 g. N-parachlorobenzoyl-N-(2-carboxy-4-methoxyphenyl)alanine (0.1 mole), 24.6 g. (0.3) sodium acetate and 125 ml. acetic anhydride is stirred and refluxed one hour, cooled to 75° and slowly diluted with 25 ml. water. Solvents are largely removed in vacuo and the acetate precipitated by adding to 250 ml. water.

EXAMPLE 16

(a) The product of Example 15 is converted to the indoxyl by refluxing overnight with 200 ml. water, 125 ml. dioxane and 20 g. sodium sulfite. After concentration in vacuum and dilution with water, the product, 1-p-chlorobenzoyl-2-methyl-5-methoxyindoxyl, is filtered and recrystallized from ethanol.

(b) When the appropriate acid chloride is used in Example 14 in place of p-chlorobenzoyl chloride and the product is carried through Examples 15 and 16a, there is obtained a 1-acyl-2-methyl-5-methoxyindoxyl in which the 1-acyl group is any of the 1-acyl groups on the ethers of Example 8 or the acetals of Example 2.

Similarly, when the appropriate N-(4-substituted-2-carboxyphenyl)alanines are used in place of the 4-methoxy compound in the procedure of Example 14 and the product is carried through the procedures of Examples 15 and 16a, the product obtained is a 1-acyl indoxyl having the other 5-substituents shown in Examples 2 and 8 on indolyl ethanol ethers and acetaldehyde acetals.

EXAMPLE 17

Ten and four-tenths grams of malonic acid, 29.9 g. of 1 - p - chlorobenzoyl - 2 - methyl - 5 - methoxyindoxyl and 25 ml. of pyridine are mixed and warmed to 40° C. till the acid is dissolved. Piperidine (0.8 ml.) is then added and the temperature of the reaction mixture raised to 80° C. for 3 hours. The cooled reaction mixture is poured into 200 ml. of cold water and acidified with 5 N hydrochloric acid to pH 2 to 2.5. The crystals are collected, washed with water. The washed acid (30.5 g.) is dissolved in 200 ml. of benzene, containing 2.5 g. p-toluenesulfonic acid and heated to reflux. The water which is formed is separated by a Dean-Stark separator. After no water formation is observed (2 hours) the hot benzene solution is washed three times with hot (75° C.) water, dried and concentrated to 100 ml. and cooled to 10°. The crystalline product is filtered and recrystallized from t-butanol. M.P. 158–150° C.

EXAMPLE 18

A mixture of 31.6 g. N-parachlorobenzoyl-2-methyl-5-methoxyindoxyl (0.1 mole) and 500 ml. of 1:1 benzene-ether is refluxed with stirring for five hours, during which time 23.5 ml. of t-butyl bromoacetate is added, and, in portions accompanied by small iodine crystals, 50 g. of granular zinc. After two hours more of reflux, the reaction is cooled, 50 ml. of 1:1 methanol-acetic acid is slowly added, and the zinc filtered and washed several times with ether. The combined solutions are shaken with 400 ml. water and 20 ml. acetic acid. The layer is washed three times with dilute ammonia (100 ml.) and once with water (100 ml.) after drying ($MgSO_4$) and removal of the solvents to yield crude 1-p-chlorobenzoyl-2-methyl-3-hydroxy-5-methoxyindole-3-acetic acid 5-butyl ester.

EXAMPLE 19

The crude product of Example 18 is taken up in 375 ml. of toluene and heated at 95–100° for one hour with 3 g. of p-toluene sulfonic acid. The solution is then washed three times with 100 ml. of hot water. On cooling the toluene solution, the product, 1-p-chlorobenzoyl-2-methyl-5-methoxyindole-3-acetic acid crystallizes. It is filtered, recrystallized from t-butanol and then dried in vacuo at 80° C.

EXAMPLE 20

(a) *Preparation of ylid.*—To a solution of 262 g. of triphenylphosphine in 1200 ml. benzene, add over 30 minutes, 183 g. t-butyl bromoacetate at 35–40°. Stir overnight, filter and wash with benzene-pentane, dry at 40° in vacuo. The phosphonium salt is converted to the ylid by stirring in cold water (50 g./liter) and neutralizing to phenolphthalein with dilute alkali. The product is filtered, washed, dried, and recrystallized from pentene-acetic acid.

(b) *Wittig reaction.*—To 37.6 g. (0.1) ylid in $CH_2Cl_2$ (50 ml.) slowly add a concentrated solution of 31.6 g. (0.1) indoxyl in the same solvent. Reflux overnight, concentrate to half volume, add 100 ml. petroleum-ether and filter the $\phi_3P=O$ quickly while still warm. Chill in ice to precipitate the product. A second crop can be obtained by concentrating the mother liquors.

EXAMPLE 21

The procedure of Example 19 is followed with the product of Example 20. The results are similar to those of Example 19, yielding the free acid when the t-butyl ester is the starting material and the indole ester when another ester is used in the Wittig reaction.

EXAMPLE 22

31.57 g. (0.1 mole) of 1-p-chlorobenzoyl-2-methyl-5-methoxyindolyl is added to a slurry of 0.11 mole of chloromagnesium-t-butylacetate in 300 ml. of petroleum ether (prepared from isopropylmagnesium chloride and t-butylacetate). The slurry is aged at 20–60° C. for one to five hours with good stirring. The hydroxy ester is obtained by addition of 200 ml. 20% ice cold ammonium chloride solution so the reaction mixture. The precipitated product is isolated by filtration and dried in vacuo.

The crude hydroxy ester is added to a solution of 3.0 g. of p-toluene sulfonic acid in 300 ml. of toluene. The solution is heated to reflux. The water formed during the reaction is separated continuously by means of Dean-Stark isobutylene formation (1950 ml.) is observed. After the reaction is completed (two hours), the toluene solution is cooled to 80° C. and washed three times with warm (75–80° C.) water to remove p-toluene sulfonic acid. The toluene solution is dried—while hot—over $MgSO_4$, and concentrated to 100 ml. in vacuo. After the mixture is cooled, the crystalline product is filtered and recrystallized from boiling t-butanol. The dried product melts at 158–159° and it is identical in every aspect with 1-p-chlorobenzoyl-2-methyl-5 - methoxyindole - 3 - acetic acid.

EXAMPLE 23

A mixture of 157.8 g. of 1-p-chlorobenzoyl-2-methyl-5-methoxyindolyl, 42.5 g. of cyanoacetic acid, 1.5 g. ammonium acetate, 6 ml. acetic acid, and 50 ml. benzene is refluxed with stirring for 24 hours, using a Dean-Stark trap to remove the water formed. After cooling, the reaction mixture is diluted with 150 ml. benzene, washed several times with water, dried, and evaporated to a small volume. On chilling, the intermediate 1-p-chlorobenzoyl-2-methyl-5-methoxy-3-indolyl acetonitrile separates and is obtained by filtration.

When any of the other indoxyls prepared as shown in Example 16b is used in the above procedure, the corresponding indolyl acetonitrile is obtained.

EXAMPLE 24

A solution of 25 g. of p-methoxyphenyl hydrazine hydrochloride and 20 g. of levulinonitrile in 250 ml. of 2 N ethanolic HCl is heated on a steam bath for a few minutes. An exothermic reaction ensues, with $NH_4Cl$ separating. The mixture is allowed to reflux gently without heating until the exothermic reaction subsides. It is then heated at reflux for 30 minutes and concentrated in vacuo to about 80 ml. Dilution with 400 ml. of water is followed by ether extraction. The extract is washed with saturated $NaHCO_3$ solution folowed by water and dried. The dry solution is filtered and concentrated to a dark syrup which is purified by chromatography on acid washed alumina, eluting with ether-petroleum ether mixtures progressing from 1:9 to 1:1. The syrup so obtained is crude 2-methyl-5-methoxyindole-3-acetonitrile.

EXAMPLE 25

The procedure of Example 2 is followed, using 2-methyl-5-methoxy-3-indolyl acetonitrile as the starting material instead of the product of Example 1, to produce 1-p-chlorobenzoyl-2-methyl-5-methoxy-3-indolyl acetonitrile.

EXAMPLE 26

The nitrilase enzyme used is extracted with 0.1 M phosphate buffer, pH 7.5, from the leaves of oats (Avena), barely (Hondeum), the Brassica-family and certain Musaceoe. Ten (10) to 50 g. of the material are extracted per 100 ml. of buffer.

1-p-chlorobenzoyl-2-methyl-5-methoxy-3 - indolyl acetonitrile is dissolved in a quantity of methanol such that the final concentration of methanol is between 10 to 30 percent in the enzymene-substrate mixture. The final substrate concentration is kept between 0.1 to 10 percent. The hydrolysis is carried out at 25–37° C. for 1 to 6 hours. The pH is maintained at 7.0–8.0 by the addition of dilute alkali. At end of this time, the mixture is acidified to pH 1–2 with dilute HCl and extracted with chloroform. The chloroform extracts are washed with water and concentrated in vacuo to dryness leaving a residue of crude indomethacin.

EXAMPLE 27

(a) The procedure of Example 5a is followed, using the acetate ester of 4-ketopentanol in equivalent quantity in place of the trityl ether of the same alcohol. The product obtained is 2-methyl-5-methoxyindolyl-3-ethyl acetate.

(b) The procedure of Example 8a is followed, using the prouct of Example 27a in place of that of 5a. The product obtained is 1-p-chlorobenzoyl-2-methyl - 5 - methoxyindolyl-3-ethyl acetate.

(c) The procedure of Example 11 is followed, using the product of Example 27b in place of the trityl ether. The product obtained is 1-p-chlorobenzoyl-2-methyl-5-methoxyindolyl-3-ethanol.

EXAMPLE 28

When the procedure of Example 27 is following using the propionate, butyrate, benzoate, stearate and acrylate of 4-ketopentanol, the corresponding esters are obtained.

When the following acid chlorides are used in place of p-chlorobenzoyl chloride, the corresponding 1-aroylindolylethyl ester is obtained:

benzoyl chloride;
p-methylthiobenzoyl chloride;
3,4,5-trimethoxybenzoyl chloride;
p-phenoxybenzoyl chloride;
p-trifluoroacetylbenzoyl chloride;
p-N,N-dimethylsulfamylbenzoyl chloride;
3-furoyl chloride;
1-methylimidazol-5-carboxylic acid chloride;
1,3-dimethyl-2,3-dihydro-2-oxoimidazole-4-carboxylic acid chloride;
1-methyl-benzimidazol-2-carboxy chloride;
5-fluoro-2-thenoyl chloride;
3-thenoyl chloride;
5-nitro-2-furoyl chloride;
1-methyl-indazole-3-carboxy chloride;
1-methyl-6-nitro-indazole-3-carboxy chloride;
oxazole-4-carboxy chloride;
benzoxazole-2-carboxy chloride;
thiazole-4-carboxy chloride;
thiazole-2-carboxy chloride;
2-phenylthiazole-4-carboxy chloride;
2-benzylmercaptothiazole-4-carboxy chloride;
p-acetylbenzoyl chloride;
N,N-dimethyl-p-carboxamidobenzoyl chloride;
p-cyanobenzoyl chloride;
p-carbomethoxybenzoyl chloride;
p-formylbenzoyl chloride;
p-trifluoro-methyl-thiobenzoyl chloride;
N,N-dimethyl-p-sulfonamidobenzoyl chloride;

p-methylsulfinylbenzoyl chloride;
p-methylsulfonylbenzoyl chloride;
p-benzylthiobenzoyl chloride;
p-mercaptobenzoyl chloride;
p-nitrobenzoyl chloride;
p-dimethylaminobenzoyl chloride;
p-acetaminobenzoyl chloride;
o-fluoro-p-chlorobenzoyl chloride;
o-methoxy-p-chlorobenzoyl chloride;
o-hydroxy-p-chlorobenzoyl chloride;
2,4,5-trichlorobenzoyl chloride.

EXAMPLE 29

A total of 0.1 mole of β-[1(p-chlorobenzoyl)-2-methyl-5-methoxy-3-indolyl] ethanol is mixed with 0.12 mole of acetyl chloride and 20 ml. of a 20% sodium hydroxide solution and heated at 50° C. for 1 hour. The product which precipitates is filtered, washed with water and dried to produce β-[1-(p-chlorobenzoyl)-2-methyl-5-methoxyindole-3] ethyl acetate.

In a similar manner, by substituting other acylating agents in place of acetyl chloride and utilizing other indolyl alcohols in the above procedure, the following esters are prepared:

β-[1-(5-nitro-2-furoyl)-2-ethyl-5-fluoroindole-3] propyl propionate;

β-[(1-nicotinoyl)-2-phenyl-5-benzyloxyindole-3] butyl benzoate;

β-[1-(1-methylbenzimidazol-2-carboxy)-2-cyclohexyl-4-trifluoromethyl-5-diisopropylsulfamylindole-3]-β-isopropylethyl butyrate;

β-[1-(thiazole-4-carboxy)-2-isopropyl-5-nitroindole-3]-hexyl phenylacetate;

β-[1-(p-phenoxybenzoyl)-2-butyl-5-benzylthioindole-3] pentyl nicotinate;

β-[1-(2-phenylthiazole-4-carboxy)-2-(o-tolyl)-5-phenyloxyindole-3] ethyl-2-pyrrolecarboxylate;

β-[1-(p-methylsulfonylbenzoyl-2-cyclopentyl-5-benzyloxyindole-3] pentyl cyclopropylacetate;

β-[1-(p-benzylthiobenzoyl-2-ethyl-5-chloromethylindole-3] ethyl-2-benzimidazole carboxylate;

β-[1-(2,4,5-trichlorobenzoyl)-2-benzyl-5-cyclopropylindole-3]-β-t-butyl-ethyl crotonate;

β-[1(3,4,5-trimethoxybenzoyl)-2-methyl-5-cyclobutyl-methoxyindole-3] butyl-2-ethoxy propionate.

EXAMPLE 30

β - [1 - (p-chlorobenzoyl)-2-methyl-5-nitro-3-indolyl] ethanol (0.1 mole), 0.1 mole of finely powdered phthalic anhydride and 100 ml. of benzene are heated together at 120° C., with frequent stirring, for 8 hours. The precipitate is filtered, dissolved in dilute sodium carbonate and shaken with ether. The aqueous solution, free of ether, is the acidified and the crude mono acid separates. It is taken up in chloroform, washed with water, dried over calcium chloride, filtered and the chloroform evaporated to produce β - [1-(p-chlorobenzoyl)-2-methyl-5-nitroindole-3] ethyl hydrogen phthalate.

In like manner, any acylated indolyl alcohol prepared in the preceding examples will form the corresponding monobasic ester upon treatment with any other dibasic acid, for example:

β-[1-(p-trifluoromethylthiobenzoyl)-2-benzyl-5-chloroindole-3] propyl hydrogen succinate;

β-[1-(p-carbomethoxybenzoyl)-2-heptyl-5-isopropylbenzyloxyindole-3]-β-t-butyl ethyl hydrogen benzoate;

β-[1(o-methoxy-p-chlorobenzoyl)-2-(p-methoxy-phenyl)-5-ethylthioindole-3]-heptyl hydrogen malonate;

β-[1(p-dimethylaminobenzoyl-2-allyl-5-dimethylsulfamylindole-3] ethyl hydrogen fumarate;

β-[1-(2-benzylmercaptothiazole-4-carboxy)-2-phenyl-5-cyclobutyloxyindole-3]-β-isopropylethyl hydrogen glutarate;

β-[1-(p-formylbenzoyl)-2-ethyl-5-mercaptoindole-3]-β-triethylmethylethyl hydrogen citraconate.

EXAMPLE 31

A total of 0.025 mole of β-[1-(p-chlorobenzoyl)-2-methyl-5-nitroindole-3] ethyl acetate in 100 ml. of ethanol is hydrogenated in the presence of 120 mg. of a 10% palladium-on-charcoal catalyst, at room temperature and a pressure of 40 p.s.i. After the theoretical amount of hydrogen has been consumed the hydrogenation is stopped, and the solution filtered to remove the catalyst. The filtrate is concentrated to dryness in vacuo to give β-[1-(p-chlorobenzoyl)-2-methyl-5-aminoindole-3] ethyl acetate.

In like manner, any other 5-nitro ester prepared in accordance with the procedures of this invention may be reduced to its corresponding 5-amino compound.

EXAMPLE 32

(a) A mixture of 0.02 mole of β-[1-(p-chlorobenzoyl)-2-methyl-5-aminoindole-3] ethyl acetate, 0.044 mole of ethylene oxide and 0.03 mole of acetic acid in 300 ml. of dimethoxyethane is heated to 100° C. for 18 hours in an autoclave. The mixture is then diluted with water and filtered to yield β-[1-(p-chlorobenzoyl)-2-methyl-5-bis-(β-hydroxyethyl) aminoindole-3] ethyl acetate.

(b) The product of Example 32a is stirred at 0° C. in pyridine with two mole proportions of p-toluenesulfonyl chloride until the reaction is substantially complete. The mixture is poured into water and the 5-bis (p-toluenesulfonylethyl) amino compound is isolated. This is dissolved in benzene and one mole proportion of methylamine is added. The mixture is allowed to stand at room temperature for 3 days. The mixture is poured into iced water containing two equivalents of sodium carbonate and extracted with ether immediately. Evaporation of the ether yields β-[1-(p-chlorobenzoyl)-2-methyl-5-(4'-methyl - 1'-piperazinyl-indole-3] ethyl acetate.

(c) A solution of p-toluenesulfonyl chloride in 200 ml. of benzene is added dropwise with stirring to a solution of the product of part a (0.1 mole) and pyridine (0.3 mole), in 300 ml. of benzene at room temperature over a one hour period. The mixture is then heated under reflux for three hours, washed with water and dried to produce β-[1-(p-chlorobenzoyl)-2-methyl-5-(4'-morpholinyl)-indole-3] ethyl acetate.

EXAMPLE 33

To a solution of 0.001 mole of β-[1-(p-chlorobenzoyl)-2-methyl-5-nitroindole-3] ethyl acetate in 20 ml. of distilled dimethoxyethane is added 1.5 ml. of glacial acetic acid and 0.5 ml. of 37% solution of aqueous formaldehyde. This mixture is reduced with Raney nickel at 40 p.s.i. and room temperature. After the theoretical amount of hydrogen has reacted, the reaction mixture is filtered, concentrated in vacuo to a small volume and diluted with ether. The ether solution is washed with sodium bicarbonate, then with water, dried with anhydrous sodium sulfate and concentrated in vacuo to produce β-[1-(p-chlorobenzoyl)-2-methyl-5-dimethylaminoindole-3] ethyl acetate.

EXAMPLE 34

(a) To 0.001 mole of β-[1-(p-chlorobenzoyl)-2-methyl-5-nitroindole-3] ethyl acetate in 30 ml. of anhydrous ethyl acetate is added 0.003 mole of acetic anhydride. The mixture is reduced with Raney nickel at room temperature and 40 p.s.i. After the theoretical amount of hydrogen has been absorbed, the catalyst is removed by filtration. The solution is concentrated in vacuo to a small volume and poured into an ice water-ether mixture. The ether layer is separated and the aqueous layer is washed with ether. The combined ether extracts are washed with sodium bicarbonate, followed by water, dried with anhydrous sodium sulfate and concentrated in vacuo to dryness to produce β-[1-(p-chlorobenzoyl)-2-methyl-5-acetaminoindole-3] ethyl acetate.

(b) β - [1 - (p - chlorobenzoyl) - 2 - methyl - 5 - acet-aminoindole-3] ethyl acetate is added to a suspension of sodium hydride in dimethylformamide with stirring and ice-cooling. After one hour methyl iodide is added and the mixture is stirred overnight. The reaction mixture is poured into iced-water and extracted with ether. Evaporation of the ethereal solution yields β-[1-(p-chlorobenzoyl) - 2 - methyl - 5 - (N - methylacetamido) - indole - 3] ethyl acetate.

EXAMPLE 35

Add 0.0005 mole of β-[1-(p-chlorobenzoyl)-2-methyl-5-aminoindole-3] ethyl acetate, 1 g. of 1,4-dibromobutane and 0.975 g. of anhydrous sodium carbonate to 80 ml. of ethanol and stir at reflux for six hours in a nitrogen atmosphere. The reaction mixture is filtered and the filtrate concentrated in vacuo to a small volume and diluted with ether. The solution is washed twice with water, dried in anhydrous sodium sulfate and concentrated in vacuo to dryness to produce β-[1-(p-chlorobenzoyl)-2-methyl-5-(1-pyrrolidino)-indole-3] ethyl acetate.

When ethylene dibromide is used instead of dibromobutane, the product obtained is the 5-(1-azacyclopropyl) indole ether.

We claim:

1. A compound of the formula

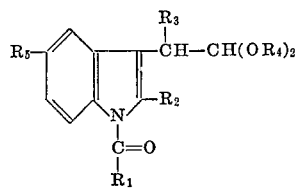

wherein $R_1$ is Ar or Het where Ar is phenyl, naphthyl, biphenyl or substituted phenyl where the substituent is lower alkyl, halogen, lower alkoxy, phenoxy, trifluoroacetyl, nitro, lower alkanoyl, cyano, carbloweralkoxy, trifluoromethyl, lower alkyl sulfinyl, lower alkyl sulfonyl, benzylthio, mercapto, dilower alkyl amino, hydroxy, lower alkylthio, benzyloxy, dilower alkyl sulfamyl, dilower alkyl carboxamido, formyl, trifluoromethylthio, dilower alkyl sulfonamido, acetamino, halolower alkoxy or acetoxy and where Het is lower alkyl imidazolyl, lower alkyl pyridyl, halopyridyl, lower alkoxy pyridyl, phenyl pyridyl, thienyl, halothienyl, furyl, nitrofuryl, lower alkyl indazolyl, nitroindazolyl, oxazolyl, lower alkyl oxazolyl, phenyl oxazolyl, benzoxazolyl, thiazolyl, phenylthiazolyl, benzylmercaptothiazolyl, lower alkyl pyrryl, lower alkyl pyrazolyl, phenylpyrazolyl, phenylisoxazolyl, benzoisothiazolyl, 1,2,3-thiadiazolyl, lower alkyl 1,2,3-triazole, pyronyl, pryidazyl, lower alkyl pyridazyl, phenylpyridazyl, ketopyridazyl, lower alkyl pyrimidyl, halopyrimidyl, pyrazinyl, lower alkoxy pyrazinyl, lower alkyloxoimidazolyl or lower alkyl benzimidazolyl;

$R_2$ is lower alkyl;

$R_3$ is hydrogen or lower alkyl;

$R_4$ is lower alkyl, lower alkenyl or benzyl; and $R_5$ is hydrogen, halogen, lower alkyl, lower alkenyl, lower alkoxy, nitro, dilower alkylamino, benzyl mercapto, lower alkyl acetamino, bis(hydroxylower alkyl)amino, lower alkyl piperazinyl, morpholinyl, cyano, aminolower alkyl, dilower alkylaminolower alkyl or dilower alkyl sulfonamido.

2. 1 - (p - chlorobenzoyl) - 2 - methyl - 5 - methoxy-3-indolyl acetaldehyde dimethylacetal.

3. 1 - (p - chlorobenzoyl) - 2 - methyl - 5 - methoxy-3-indolyl acetaldehyde diethylacetal.

4. 1 - (1 - p - chlorobenzoyl) - 2 - methyl - 5 - dimethylamino-3-indolyl acetaldehyde dimethylacetal.

5. A compound of the formula

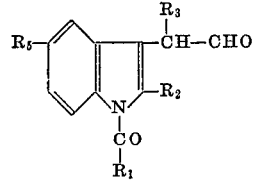

wherein $R_1$ is Ar or Het where Ar is phenyl, naphthyl, biphenyl or substituted phenyl where the substituent is lower alkyl, halogen, lower alkoxy, phenoxy, trifluoroacetyl, nitro, lower alkanoyl, cyano, carbloweralkoxy, trifluoromethyl, lower alkyl sulfinyl, lower alkyl sulfonyl, benzylthio, mercapto, dilower alkyl amino, hydroxy, lower alkylthio, benzyloxy, dilower alkyl sulfamyl, dilower alkyl carboxamido, formyl, trifluoromethylthio, dilower alkyl sulfonamido, acetamino, halolower alkoxy or acetoxy and where Het is lower alkyl imidazolyl, lower alkyl pyridyl, halopyridyl, lower alkoxy pyridyl, phenyl pyridyl, thienyl, halothienyl, furyl, nitrofuryl, lower alkyl indazolyl, nitroindazolyl, oxazolyl, lower alkyl oxazolyl, phenyl oxazolyl, benzoxazolyl, thiazolyl, phenylthiazolyl, benzylmercaptothiazolyl, lower alkyl pyrryl, lower alkyl pyrazolyl, phenylpyrazolyl, phenylisoxazolyl, benzoisothiazolyl, 1,2,3-thiadiazolyl, lower alkyl 1,2,3-triazole, pyronyl, pyridazyl, lower alkyl pyridazyl, phenylpyridazyl, ketopyradazyl, lower alkyl pyrimidyl, halopyrimidyl, pyrazinyl, lower alkoxy pyrazinyl, lower alkyloxoimidazolyl or lower alkyl benzimidazolyl;

$R_2$ is lower alkyl;

$R_3$ is hydrogen or lower alkyl; and $R_5$ is hydrogen, halogen, lower alkyl, lower alkenyl, lower alkoxy, nitro, dilower alkylamino, benzyl mercapto, lower alkyl acetamino, bis(hydroxylower alkyl) amino, lower alkyl piperazinyl, morpholinyl, cyano, aminolower alkyl, dilower alkylaminolower alkyl or dilower alkyl sulfonamido.

6. 1-p-chlorobenzoyl-2-methyl - 5 - methoxyl-3-indolyl acetaldehyde.

7. 1-p-chlorobenzoyl-2-methyl - 5 - dimethylamino-3-indolyl acetaldehyde.

8. A compound of the formula

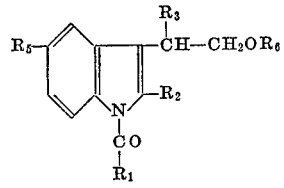

wherein $R_1$ is Ar or Het where Ar is phenyl, naphthyl, biphenyl or substituted phenyl where the substituent is lower alkyl, halogen, lower alkoxy, phenoxy, trifluoroacetyl, nitro, lower alkanolyl, cyano, carbloweralkoxy, trifluoromethyl, lower alkyl sulfinyl, lower alkyl sulfonyl, benzylthio, mercapto, dilower alkyl amino, hydroxy, lower alkylthio, benzyloxy, dilower alkyl sulfamyl, dilower alkyl carboxamido, formyl, trifluoromethylthio, dilower alkyl sulfonamido, acetamino, halolower alkoxy or acetoxy and where Het is lower alkyl imidazolyl, lower alkyl pyridyl, halopyridyl, lower alkoxy pyridyl, phenyl pyridyl, thienyl, halothienyl, furyl, nitrofuryl, lower alkyl indazolyl, nitroindazolyl, oxazolyl, lower alkyl oxazolyl, phenyl oxazolyl, benzoxazolyl, thiazolyl, phenylthiazolyl, benzylmercaptothiazolyl, lower alkyl pyrryl, lower alkyl pyrazolyl, phenylpyrazolyl, phenylisoxazolyl, benzoisothiazolyl, 1,2,3-thiadiazolyl, lower alkyl 1,2,3-triazole, pyronyl, pyridazyl, lower alkyl pyridazyl, phenylpyridazyl, ketopyridazyl, lower alkyl pyrimidyl, halopyrimidyl, pyrazinyl, lower alkoxy pyrazinyl, lower alkyloxoimidazolyl or lower alkyl benzimidazolyl;
$R_2$ is lower alkyl;
$R_3$ is hydrogen or lower alkyl;
$R_5$ is hydrogen, halogen, lower alkyl, lower alkenyl, lower alkoxy, nitro, dilower alkylamino, benzyl mercapto, lower alkyl acetamino, bis(hydroxylower alkyl)-amino, lower alkyl piperazinyl, morpholinyl, cyano, aminolower alkyl, dilower alkylaminolower alkyl or dilower alkyl sulfonamido; and
$R_6$ is lower alkyl, lower alkenyl, benzyl or trityl.

9. 1-p-chlorobenzoyl-2-methyl - 5 - methoxy-3-indolyl ethanol t-butyl ether.

10. 1-p-chlorobenzoyl-2-methyl - 5 - methoxy-3-indolyl ethanol benzyl ether.

11. 1-p-chlorobenzoyl-2-methyl - 5 - dimethylamino-3-indolyl ethanol t-butyl ether.

12. 1-p-chlorobenzoyl-2-methyl - 5 - dimethylamino-3-indolyl ethanol benzyl ether.

References Cited

UNITED STATES PATENTS

| | | | |
|---|---|---|---|
| 3,075,993 | 1/1963 | Chemerda et al. | 260—326.14 |
| 3,242,192 | 3/1966 | Shen et al. | 260—326.13 |

OTHER REFERENCES

Noller, Chemistry of Organic Compounds, 3rd ed. (1965), p. 228.

ALEX MAZEL, Primary Examiner

J. A. NARCAVAGE, Assistant Examiner

U.S. Cl. X.R.

260—247.1, 247.2, 247.5, 250, 256.4, 256.5, 268, 294.8, 295, 297, 302, 304, 307, 308, 309, 309.2, 310, 326.11, 326.12, 326.13, 326.14, 326.16